United States Patent
Li (10) Patent No.: US 8,020,902 B1
(45) Date of Patent: Sep. 20, 2011

(54) INTEGRATED SNAP AND HANDLING FEATURE

(75) Inventor: Hsu Li, Sinjhuang (TW)

(73) Assignee: Flextronics AP, LLC, Broomfield, CO (US)

( * ) Notice: Subject to any disclaimer, the term of this patent is extended or adjusted under 35 U.S.C. 154(b) by 502 days.

(21) Appl. No.: 11/623,391

(22) Filed: Jan. 16, 2007

Related U.S. Application Data (60) Provisional application No. 60/758,778, filed on Jan. 13, 2006.

(51) Int. Cl.
*E05C 19/06* (2006.01)

(52) U.S. Cl. .................. 292/80; 292/303; 292/DIG. 16; 292/DIG. 38; 292/DIG. 63

(58) Field of Classification Search .................. 292/80, 292/13, 17, 19, 28, 38, 90, 125, 107, 180, 292/141, 152, 225, 209, 303 X, DIG. 63, 292/DIG. 38, DIG. 30, DIG. 17, DIG. 16
See application file for complete search history.

(56) References Cited

U.S. PATENT DOCUMENTS

| | | | | |
|---|---|---|---|---|
| 4,542,924 A | * | 9/1985 | Brown et al. | .................. 292/87 |
| 4,710,851 A | | 12/1987 | Pastecki | |
| 4,881,764 A | * | 11/1989 | Takahashi et al. | .............. 292/13 |
| 5,127,684 A | * | 7/1992 | Klotz et al. | .................. 292/113 |
| 5,452,181 A | | 9/1995 | Hoover | |
| 5,566,749 A | | 10/1996 | Jordan et al. | |
| 6,031,719 A | | 2/2000 | Schmitt et al. | |
| 6,272,007 B1 | | 8/2001 | Kitlas et al. | |
| 6,373,697 B1 | | 4/2002 | Lajara et al. | |
| 6,401,807 B1 | | 6/2002 | Wyler et al. | |
| 6,674,641 B2 | | 1/2004 | Jensen et al. | |
| 6,744,630 B2 | | 6/2004 | Hutchinson et al. | |
| 6,809,928 B2 | | 10/2004 | Gwin et al. | |
| 2002/0041484 A1 | | 4/2002 | Lajara et al. | |
| 2002/0089820 A1 | | 7/2002 | Abboud | |
| 2004/0125561 A1 | | 7/2004 | Gwin et al. | |
| 2004/0240175 A1 | | 12/2004 | Brovald et al. | |
| 2004/0246677 A1 | | 12/2004 | Chen | |

* cited by examiner

*Primary Examiner* — Carlos Lugo
*Assistant Examiner* — Mark Williams
(74) *Attorney, Agent, or Firm* — Karl A. Dierenbach; Robert G. Crouch; Marsh Fischmann & Breyfogle LLP (57) ABSTRACT

An integrated snap and handling apparatus is provided. The apparatus may be capable of being assembled with and disassembled from a mating component without damage. The apparatus may include a pair of features that provide an intuitive and easy user interface for removal, handling and installation. The pair of features may allow a user to use a pinching motion to engage and disengage the apparatus from the mating component without the use of a tool. The integrated snap and handling apparatus may provide for low removal forces when the user interface is properly actuated while resisting high separation forces when the user interface is not properly actuated. The integrated snap and handling apparatus may be incorporated into a wide variety of assemblies and devices. For example, the integrated snap and handling apparatus may be incorporated into a cooling duct for the control of airflow around an electronic component.

2 Claims, 8 Drawing Sheets

INTEGRATED SNAP AND HANDLING FEATURE

CROSS REFERENCE TO RELATED APPLICATIONS

This patent application claims priority to and thus the benefit of an earlier filing date from U.S. Provisional Patent Application No. 60/758,778 (filed Jan. 13, 2006), the entire contents of which are hereby incorporated by reference.

BACKGROUND

Snaps are fastening mechanisms that may be used to secure one member to another. For example, snaps are commonly used to secure plastic components together in consumer goods such as electronic devices or toys. Snaps are often integrated into the components to be secured to each other, thus reducing or eliminating the need for separate connection members such as screws. Snaps typically include a flexible portion that may deflect during assembly. They may further include a protrusion that may interconnect or interact with a mating portion to secure the components together.

A snap may be intended for one-time operation or it may be intended for multiple assembly and disassembly cycles. The difference is often in the design of the protrusion. In a multiple cycle design, a portion of the protrusion may be angled so that a separation force acting on the parts causes the snap to disengage. Often, the snaps may begin to fail, or change in their ability to secure the components to each other, after a small number of assembly and disassembly cycles.

A one-time snap may have a protrusion that includes an engagement surface that is oriented perpendicular to a separation force acting on the parts. The engagement surface may interlock with a mating component. In this regard, such a force may not cause the part to disengage and the parts may be secured together until the separation force causes a component to fail.

Known snaps are often configured to require a tool to disengage the snap and allow the components to be separated. Frequently, the proper way to disengage the snap and separate the components is not obvious to a user. It may be difficult for a user to determine if two interconnected components are secured together by a one-time snap or a snap designed for multiple cycles. It may be difficult for a user to determine that a tool may be needed to disassemble the components. This may lead to the user using excessive force to disassemble the components, which could lead to damage to the components, in particular to the snap or snaps holding the components together. The process may also require the use of two hands. For example, a first hand may be required to apply a separation force to the components, while a second may be required to disengage the snap or snap mechanisms, possibly by using a tool.

Cooling ducts are commonly used in electronic assemblies where airflow control is desired. For example, many personal computers have ductwork associated with creating a particular airflow path around specific components such as Central Processing Units (CPUs) and memory units. Often, these ducts are secured in place using screws or clips. The ducts may be secured to a heat sink or fan that, in turn, may be interconnected to a CPU or other heat-generating device. Some are secured using snap together designs. However, these snap together designs typically do not provide for easy assembly and disassembly. For example, the duct and the device to which it is attached may both be required to be removed before the duct may be separated. Tools may be required to remove known ducts. Known ducts may be secured using one-time snaps that may be damaged upon removal, requiring replacement parts or additional repair work. Known ducts may require extensive examination to determine how to remove the duct without causing damage. This may be particularly true for a purchaser of the electronic assembly who may be unfamiliar with the duct fastening method.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects of thereof are described and illustrated in conjunction with systems and methods which are meant to be exemplary and illustrative, and not limiting in scope. In various embodiments, one or more of the above-described problems have been reduced or eliminated, while other embodiments are directed to other improvements.

In an aspect, a snap apparatus for attachment to and removal from a mating member without the use of tools includes a snap, a first grip member, an interconnection member, a base, a flexible member, and a second grip member. The first grip member may include a first grip member actuation surface and the second grip member may include a second grip member actuation surface. The interconnection member may be rigidly interconnected to the snap and the first grip member. The flexible member may be interconnected to and disposed between the base and the interconnection member. The first grip member actuation surface may be oriented to face in a substantially opposite direction from the second grip member actuation surface.

In an embodiment, the interconnection member may be operable to rotate relative to the base. The flexible member may be operable to torsionally flex when the interconnection member is rotated relative to said base. In an embodiment, the first grip member actuation surface may be oriented relative to the second grip member actuation surface to allow for a finger of a hand to engage one of the first grip member actuation surface and the second grip member actuation surface while a thumb of the hand simultaneously engages the other of the first grip member actuation surface and the second grip member actuation surface in a pinching motion. Such a pinching motion may cause the snap to disengage with a mating member. The pinching motion may result in rotation of the interconnection member wherein the first grip member actuation surface may be moved toward the second grip member actuation surface and the snap may be moved away from the second grip member actuation surface.

In an embodiment, the first grip member actuation surface and/or the second grip member actuation surface may be concave. Furthermore, the surfaces may be textured to assist in gripping the surfaces or may included features that may indicate to a user the function of the grip members. The first grip member actuation surface and the second grip member actuation surface may be operable to be pinched together with a pinching force of less than 4.5 kgf. A radius of curvature of both of the first grip member actuation surface and the second grip member actuation surface may be selected to comfortably fit a finger and/or thumb of a user engaging the surfaces. Such a radius may be greater than 4 mm.

In an embodiment of the present aspect, a stopper may be included. The stopper may be rigidly interconnected to the base and disposed to prevent the interconnection member from being displaced beyond a maximum predeterminable displacement when the finger and thumb pinch the first grip member actuation surface and the second grip member actuation surface toward each other.

In an embodiment, the snap may include an engagement surface extending perpendicular to the interconnection member.

In an embodiment, the snap apparatus may include a guiding member, wherein the guiding member may be slidably engageable with a mating member guiding member, wherein slidably engaging the guiding member with the mating member guiding member restricts motion of the snap apparatus relative to the mating member to a linear motion perpendicular to the engagement surface.

In an embodiment, the snap of the snap apparatus may be substantially rigid. In an embodiment, the snap engagement of the snap apparatus with the mating member may include the engagement surface in a face-to-face relation with a mating engagement surface on the mating member.

In an embodiment, the snap apparatus may be operable to withstand a force of 15 kgf oriented perpendicular to the engagement surface and applied to the engagement surface without damage or disengagement.

In an embodiment, the snap may include an installation displacement surface, wherein the installation displacement surface may be operable to slidably interact with the mating member during installation of the snap apparatus onto the mating member, wherein the interaction may be operable to displace the snap in a direction substantially parallel to the engagement surface.

In an embodiment, the interconnection member may include two guide walls disposed parallel to each other, perpendicular to the engagement surface and substantially perpendicular to the first grip member actuation surface.

In an embodiment, the flexible member may include two flexible arms disposed on opposite sides of the interconnection member.

In another aspect, a method of removal of a snap apparatus from a mating member includes gripping, with a finger of a hand and a thumb of the hand, a first grip member actuation surface and a second grip member actuation surface of the snap apparatus, pinching together, with the finger and the thumb, the first grip member actuation surface and the second grip member actuation surface, and moving an entirety of the snap apparatus with the hand while maintaining the pinching. The first grip member actuation surface may be oriented to face in a substantially opposite direction from the second grip member actuation surface.

In an embodiment, the first grip member actuation surface and/or the second grip member actuation surface may be concave. The surfaces may be textured to assist in gripping the surfaces or may included features that may indicate to a user the function of the grip members. The first grip member actuation surface and the second grip member actuation surface may be operable to be pinched together with a pinching force of less than 4.5 kgf. A radius of curvature of both of the first grip member actuation surface and the second grip member actuation surface may be selected to comfortably fit a finger and/or thumb of a user engaging the surfaces. Such a radius may be greater than 4 mm.

In an embodiment, the pinching step may include rotating a snap of the snap apparatus about a rotational axis, wherein the rotation results in the snap moving away from the second grip member actuation surface. In such an embodiment, the rotating step may include moving an engagement surface of the snap from a first position to a second position, wherein in the first position, the engagement surface may be in contact with a surface of the mating member and wherein in the second position, the engagement surface may be free from contact with the surface of the mating member.

In yet another aspect, an electronic component cooling duct operable to be attached to and removed from an electronic component without the use of tools includes a duct member, a first grip member flexibly interconnected to the duct member and a second grip member rigidly interconnected to the duct member. The duct member may include a plurality of duct walls, which at least partially define a cooling medium flow path. The first grip member may include a first grip member actuation surface and the second grip member may include a second grip member actuation surface. The first grip member actuation surface may be oriented to face in a substantially opposite direction from the second grip member actuation surface. The electronic component cooling duct may include any of the features of embodiments of the above-described snap apparatus.

In an embodiment of the electronic component cooling duct, the first grip member actuation surface may be oriented relative to the second grip member actuation surface to allow for a finger of a hand to engage one of the first grip member actuation surface and the second grip member actuation surface while a thumb of the hand simultaneously engages the other of the first grip member actuation surface and the second grip member actuation surface in a pinching motion.

The first grip member actuation surface and/or the second grip member actuation surface may be concave. Furthermore, the surfaces may be textured to assist in gripping the surfaces or may included features that may indicate to a user the function of the grip members. The first grip member actuation surface and the second grip member actuation surface may be operable to be pinched together with a pinching force of less than 4.5 kgf. A radius of curvature of both of the first grip member actuation surface and the second grip member actuation surface may be selected to comfortably fit a finger and/or thumb of a user engaging the surfaces. Such a radius may be greater than 4 mm.

In an embodiment of the present aspect, the pinching motion may move the snap away from the second grip member actuation surface.

In an embodiment of the present aspect, the electronic component cooling duct may be operable to withstand a force of 15 kgf oriented perpendicular to the engagement surface and applied to the engagement surface without damage or disengagement.

In still another aspect, a method of removal of an electronic component cooling duct from a mating component without the use of tools includes gripping, with a finger of a hand and a thumb of the hand, a first grip member actuation surface and a second grip member actuation surface of the electronic component cooling duct, pinching together, with the finger and the thumb, the first grip member actuation surface and the second grip member actuation surface to release a snap of the electronic component cooling duct from engagement with the mating component and moving an entirety of the electronic component cooling duct relative to the mating component with the hand while maintaining the pinching. The first grip member actuation surface may be oriented to face in a substantially opposite direction from the second grip member actuation surface.

In an embodiment of the present aspect, the first grip member actuation surface and/or the second grip member actuation surface may be concave. The first grip member actuation surface and the second grip member actuation surface may be operable to be pinched together with a pinching force of less than 4.5 kgf. A radius of curvature of both of the first grip member actuation surface and the second grip member actuation surface may be selected to comfortably fit a finger and/or thumb of a user engaging the surfaces. Such a radius may be greater than 4 mm.

In an embodiment of the present aspect, the pinching step may further include rotating a snap of the electronic component cooling duct about a rotational axis, wherein the rotation results in the snap moving away from the second grip member actuation surface. In such an embodiment, the rotating step may include moving an engagement surface of the snap from a first position to a second position. In the first position, the engagement surface may be in contact with a surface of the mating component and in the second position, the engagement surface may be free from contact with the surface of the mating component.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein be considered illustrative rather than limiting.

DETAILED DESCRIPTION

Reference will now be made to the accompanying drawings, which assist in illustrating various pertinent features of embodiments of the present invention. Although the embodiments will be described partially in conjunction with an electronic component cooling duct, it should be expressly understood that embodiments of the present invention may be applicable to other applications where it is desired to interconnect and separate components without the use of tools. In this regard, the following description of a snap apparatus in general and an electronic component cooling duct in particular are presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing embodiments of the invention and to enable others skilled in the art to utilize embodiments of the invention in such, or other embodiments and with various modifications required by the particular application(s) or use(s) of embodiments of the present invention.

Figure 1:
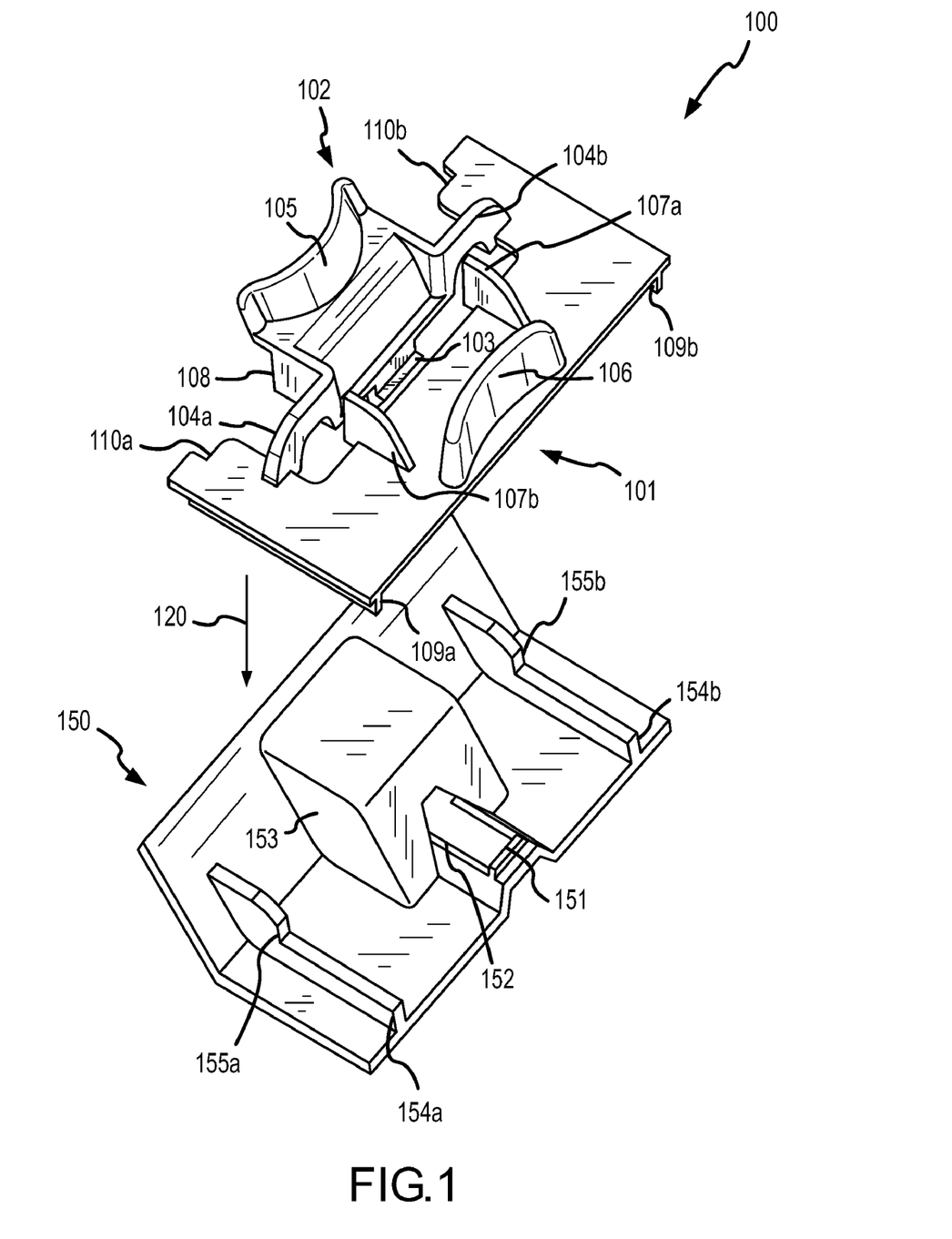
FIG. 1 is an illustration an embodiment of a snap apparatus and a mating member positioned relative to each other prior to engagement.

FIG. 1 is an illustration an embodiment of a snap apparatus 100 and a mating member 150 positioned relative to each other prior to engagement. To engage the snap apparatus 100 with the mating member 150, the snap apparatus 100, in the orientation illustrated in FIG. 1, may be moved straight down along a path 120 toward the mating member 150. This is described in detail below. Features on both the snap apparatus 100 and the mating member 150 may interact with each other to restrict motion of the snap apparatus 100 relative to the mating member 150. For example, such features may restrict the motion of the snap apparatus 100 relative to the mating member 150 to an up and down motion as illustrated by the path 120.

The snap apparatus 100 of FIG. 1 may be a component or a part of a larger apparatus. Similarly, the mating member 150 may be a component or a part of a larger apparatus. For example, the snap apparatus 100 may be part of a compartment lid and the mating member 150 may be part of a storage bin. Also for example, and as described in detail below, the snap apparatus 100 may be part of an electronic component cooling duct and the mating member 150 may be part of an electronic component cooling fan apparatus. Indeed, given the vast variety of applications of snaps as described above, the snap apparatus 100 and the mating member 150 may be integrated into a wide variety of applications.

Figure 3:
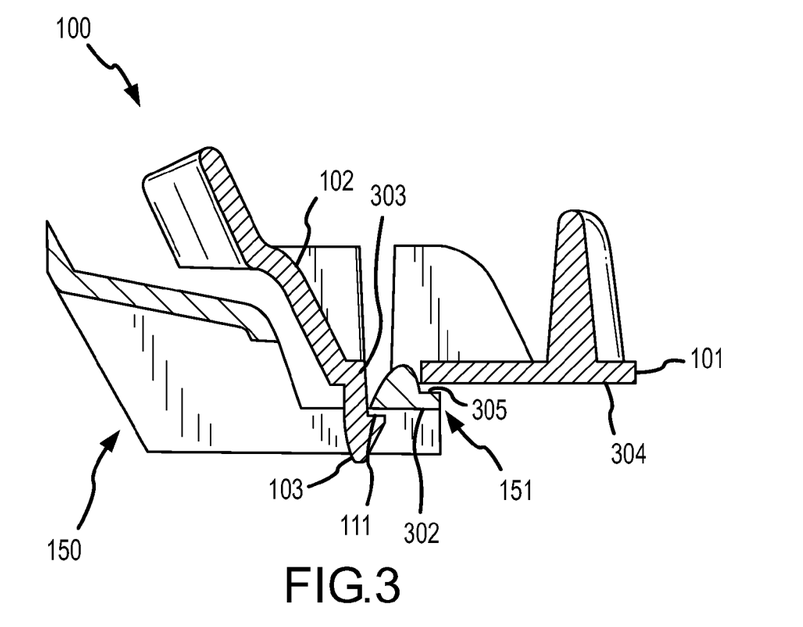
FIG. 3 is a cross-sectional view of the snap apparatus and mating member of FIG. 2.

The snap apparatus 100 may include a base 101 that, as described above, may be part of a larger apparatus. The snap apparatus 100 may also include a snap 103. Generally, the snap 103 may include an engagement surface 111, as shown in FIG. 3. The engagement surface 111 may be oriented so that it is perpendicular to the direction of relative motion between the snap apparatus 100 and the mating member 150.

The snap 103 may in turn be interconnected to an interconnection member 102. The interconnection member may be rigid and provide an interconnection between the snap 103 and a flexible member. In the embodiment illustrated in FIG. 1, the flexible member is in the form of a pair of flexible arms 104a and 104b, which flexibly interconnect the interconnection member 102 and the base 101. As described below, the pair of flexible arms 104a and 104b allow for relative motion between the interconnection member 102 and the base 101.

The interconnection member 102 may include a first grip member 105. The first grip member 105 may be configured to interact with a finger of a user. Similarly, the base 101 may include a second grip member 106 configured to interact with a finger of the user. The interconnection member 102 may also include one or more guide walls such as guide wall 108 that may be operable to, in part, guide the motion of the interconnection member 102 relative to the base 101.

The base 101 may include features to locate it relative to the mating member 150 when the snap apparatus 100 is engaged with the mating member 150. In this regard, guide rails 109a and 109b may interact with features on the mating member 150 to locate the snap apparatus 100 relative to the mating member 150. Additionally, the base 101 may include bracing surfaces 110a and 110b that may interact with complementary surfaces on the mating member 150 to position the snap apparatus 100 relative to the mating member 150 so that the snap 103 has a predetermined degree of preload against a mating feature of the mating member 150.

The snap apparatus 100 and the mating member 150 may be constructed from a wide variety of materials. For example, the snap apparatus 100 and the mating member 150 may be made of plastic, as is typical of many components, such as many consumer electronics devices, that utilize snaps. In this regard, particular components of the snap apparatus 100 and the mating member 150 may be configured differently for different materials. For example, a snap apparatus 100 made from a relatively flexible material may require flexible arms 104a and 104b with a greater cross-sectional area to achieve the same degree of flexibility than that of a snap apparatus 100 made from a relatively rigid material.

The mating member 150 may include a mating engagement feature 151 that may interact with the snap 103 to restrict motion of the snap apparatus 100 relative to the mating member 150. The mating member 150 may include an open area 152 that may provide for clearance to allow movement of the snap 103 and the interconnection member 102 during engagement and disengagement of the snap apparatus 100 with the mating member 150. Furthermore, the mating member 150 may include a guide block 153 to aid in guiding the motion of the interconnection member 102 relative to the base 101 during engagement and disengagement of the snap apparatus 100 with the mating member 150. The mating member 150 may include mating member guide rails 154a and 154b that may interact with the guide rails 109a and 109b of the snap apparatus 100 to locate the snap apparatus 100 relative to the mating member 150. Additionally, the mating member 150 may include mating member bracing surfaces 155a and 155b that may interact with the bracing surfaces 110a and 110b of the snap apparatus 100.

Figure 2:
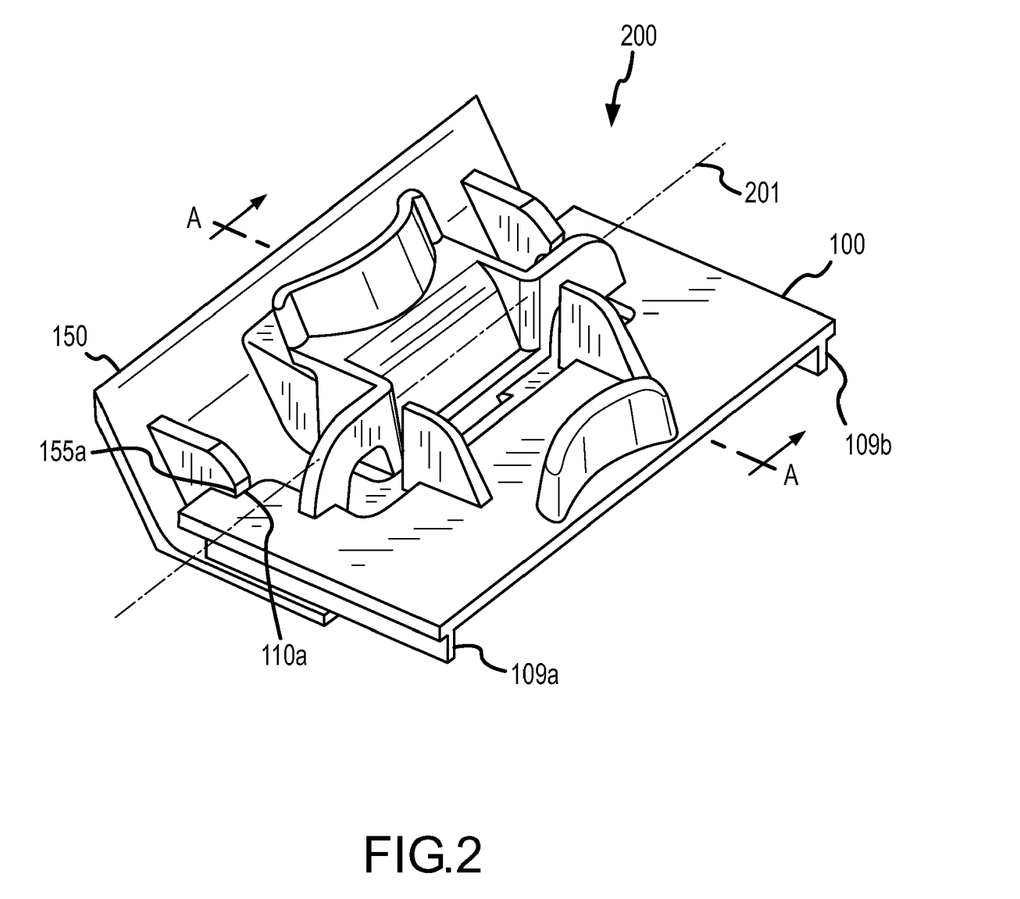
FIG. 2 is an illustration of the snap apparatus of FIG. 1 engaged with the mating member of FIG. 1.

FIG. 2 is an illustration of an assembly 200 that includes the snap apparatus 100 of FIG. 1 engaged with the mating member 150 of FIG. 1. In FIG. 2, the snap 103 is engaged with the mating engagement feature 151. This engagement is illustrated in FIG. 3, which is a cross-section of the assembly 200 along section line A-A of FIG. 2.

FIG. 3 illustrates the snap apparatus 100 engaged with the mating member 150 in a manner where movement of the snap apparatus 100 is restricted with respect to the mating member 150. In this regard, the snap 103 is engaged with the mating engagement feature 151 wherein the engagement surface 111 of the snap 103 is in a face-to-face relationship with an engagement surface 302 of the mating engagement feature 151. Such an arrangement of two parallel surfaces results in little or no torsional force being applied to the interconnection member 102 when an upward force (upward relative to the orientation of FIG. 3) is applied to the snap apparatus 100. Accordingly, the snap 103 may not disengage from the mating engagement feature 151 when such an upward force is applied. Additionally, such an arrangement may help to prevent accidental or unintentional disengagement of the snap apparatus 100 from the mating member 150.

Other embodiments may incorporate a different configuration of the engagement surface 111 and/or the engagement surface 302. For example, in an embodiment, the engagement surface 111 may oriented at an angle relative to how it is illustrated in FIG. 3. The engagement surface 111 may be angled so that its slopes from the upper left to the lower right, relative to the illustration of FIG. 3. In such an arrangement, an upward force imparted on the snap apparatus 100 may result in a sideways force to the left (as illustrated in FIG. 3) imparted on the snap 103 as the sloped engagement surface of the snap 103 interacts with the mating engagement feature 151. This may result in a sideways displacement of the snap 103 and eventually disengagement of the snap 103 from the mating member 150.

Conversely, if the engagement surface 111 and the engagement surface 302 are both angled opposite to as previously described, an upwards force imparted on the snap apparatus 100 may result in a sideways force to the right (as illustrated in FIG. 3) imparted on the snap 103 which may enhance the ability of the assembly 200 to resist unintentional disengagement between the snap apparatus 100 and the mating member 150 due to an upwards (as illustrated in FIG. 3) force applied to the snap apparatus 100.

Returning to FIG. 2, the guide rails 109a and 109b may interact with the mating member guide rails 154a and 154b to prevent lateral motion of the snap apparatus 100 relative to the mating member 150. As illustrated in FIG. 2, the guide rails 109a and 109b of the snap apparatus 100 are position along the outside edges of mating member guide rails 154a and 154b. It will be appreciated that the relative position of the guide rails 109a and 109b and the mating member guide rails 154a and 154b may be reversed without a loss of functionality.

The bracing surfaces 110a and 110b of the snap apparatus 100 may interact with the mating member bracing surfaces 155a and 155b such that the snap 103 is pressed against the mating engagement feature 151 of the mating member 150. This may be achieved by selecting a distance between the front surface 303 (as shown in FIG. 3) of the snap 103 when the snap 103 is free from external forces and the bracing surfaces 110a and 110b that is slightly greater than the distance between the mating engagement feature 151 and the mating member bracing surfaces 155a and 155b. Such an arrangement may prevent the snap apparatus 100 from moving or vibrating relative to the mating member 150. This may, for example, help to prevent rattling between the snap apparatus 100 and the mating member 150.

Figure 4:
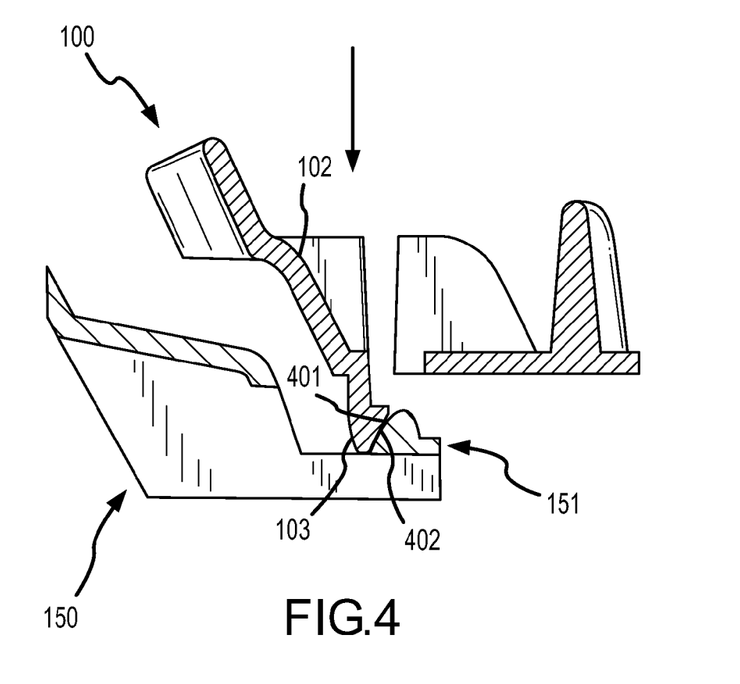
FIG. 4 is a cross-sectional view of the snap apparatus and mating member of FIG. 2 at intermediate positions during the process of engagement with each other.
Figure 5:
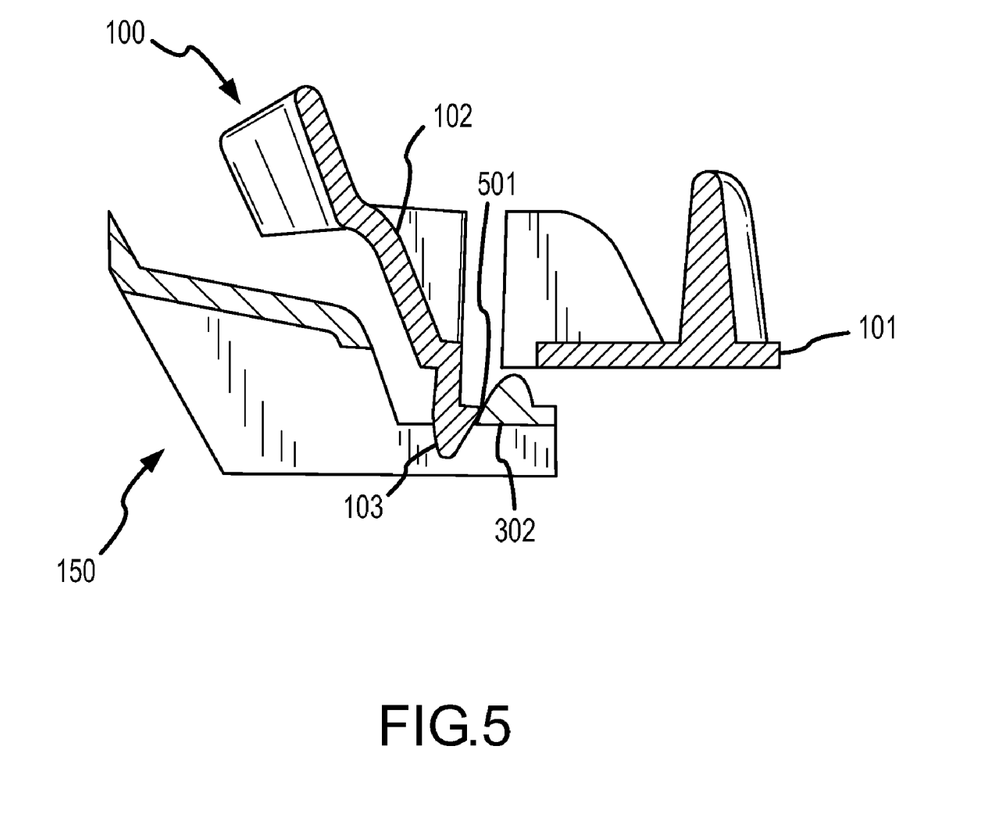
FIG. 5 is a cross-sectional view of the snap apparatus and mating member of FIG. 4 at intermediate positions subsequent to the positions illustrated in FIG. 4 during the process of engagement with each other.
Figure 7:
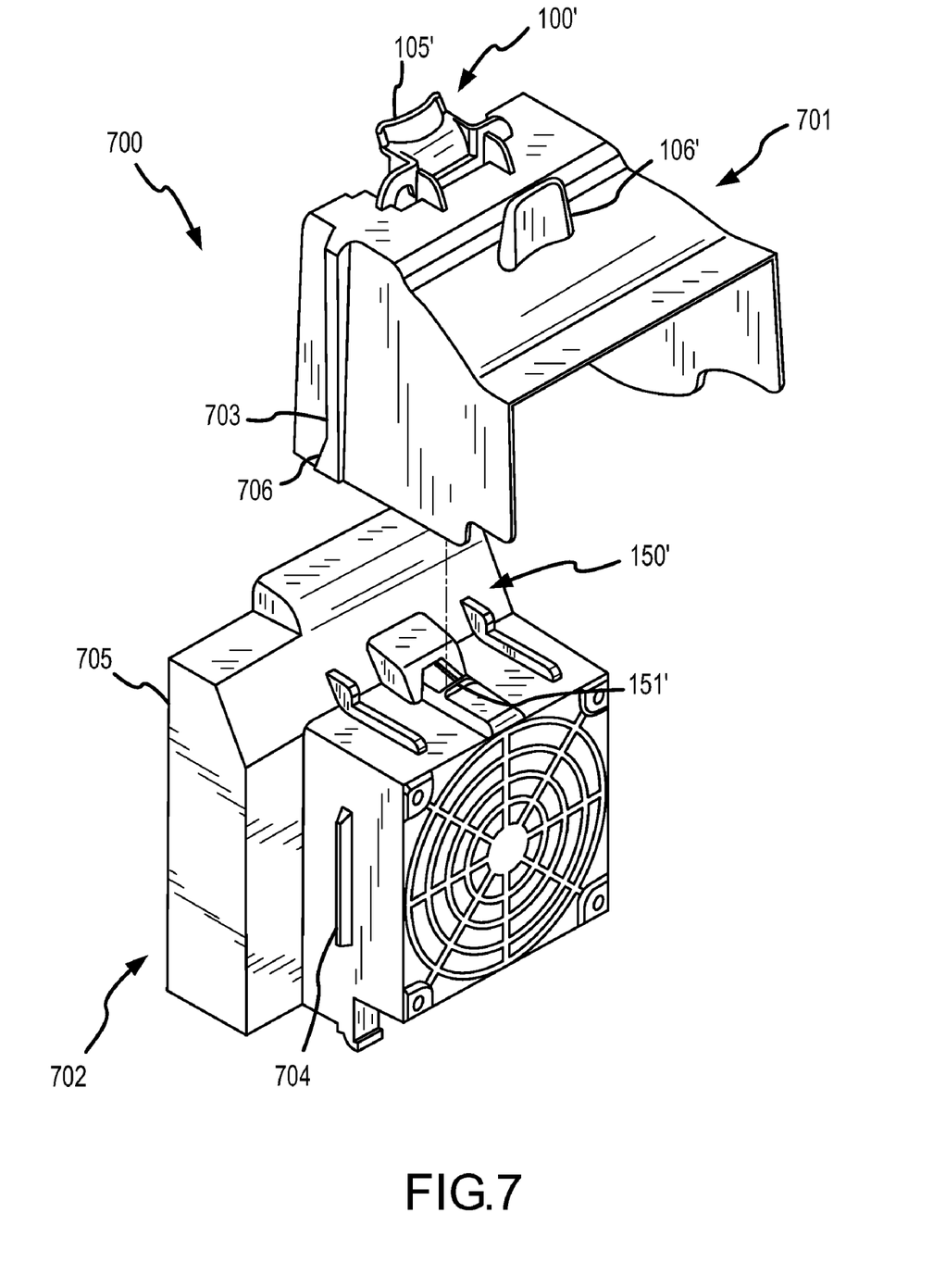
FIG. 7 is an illustration of an embodiment of an electronic component cooling duct.

An embodiment of a process of engaging the snap apparatus 100 with the mating member 150 and related features will now be discussed with reference to FIGS. 2, 3, 4 and 5. In the present embodiment, the snap apparatus 100 is moved downward (as illustrated in FIGS. 3, 4 and 5) to engage with and interconnect to the mating member 150. This movement may be confined to a downward movement by the interaction between a feature or features interconnected to the snap apparatus 100 and a feature or the features interconnected to the mating member 150. FIG. 7 and its related discussion below describe one example of such an interaction.

Returning to FIG. 4, a cross-sectional view with the cross section being taken in the same plane as in FIG. 3, the interaction between the snap apparatus 100 and the mating member 150 during the process of engagement is illustrated. In FIG. 4, the initial contact between the snap 103 and the mating engagement feature 151 is illustrated. The snap 103 includes a sloped surface 401 and the mating engagement feature 151 includes a complementary sloped surface 402.

As shown in FIG. 5, as the snap apparatus 100 is lowered, the sloped surface 401 interacts with the complementary sloped surface 402 causing the snap 103 and the entire interconnection member 102 to rotate clockwise generally about the rotational axis 201 (shown in FIG. 2). It is noted that the exact position of the rotational axis 201 may vary from that illustrated in FIG. 2. Additionally, the rotational axis 201 may vary as a function of the rotation of the interconnection member 102 and/or the movement of the interconnection member 102 relative to the base 101 may include a translational component. A resistance to the rotation of the interconnection member 102 is provided by the flexible arms 104a and 104b.

As the interconnection member 102 rotates relative to the base 101, the flexible arms 104a and 104b experience a torsional flexure.

Once the tip 501 of the snap 103 clears the engagement surface 302 of the mating engagement feature 151, the torsional flexure of the flexible arms 104a and 104b will cause the snap 103 to snap into the engaged position as illustrated in FIG. 3. A bottom surface 304 of the base 101 may come into contact with a top surface 305 of the mating engagement feature 151 to prevent the snap apparatus 100 from moving substantially beyond the point where the snap 103 fully engages with the mating engagement feature 151.

It will be appreciated that the above-described motion of engagement of the snap apparatus 100 with the mating member 150 may be performed without the use of tools. For example, a user may provide a downward force on the snap apparatus 100 until the tip 501 of the snap 103 clears the engagement surface 302 of the mating engagement feature 151 and the snap 103 snaps into the position illustrated in FIG. 3.

Figure 6:
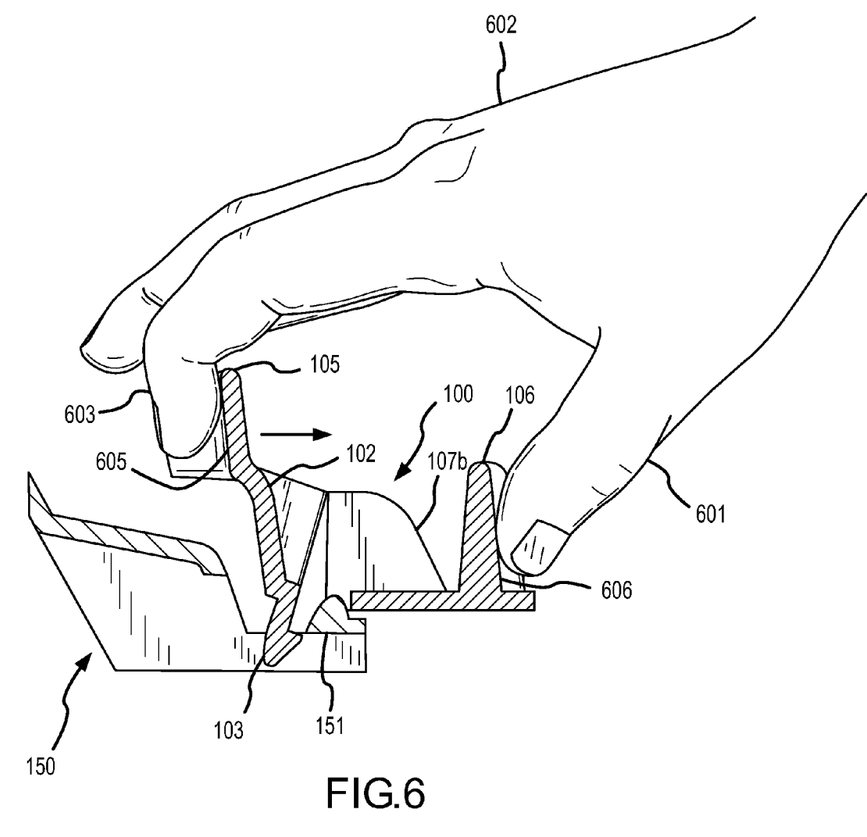
FIG. 6 is a cross-sectional view of the snap apparatus and mating member of FIG. 2 at intermediate positions during the process of disengagement with each other along with a hand of a user.

During engagement of the snap apparatus 100 with the mating member 150, a user may intentionally rotate the interconnection member 102 so that the snap 103 does not come into contact with the mating engagement feature 151 during the engagement process. As shown in FIG. 6, this may be accomplished by the user pinching together the first grip member 105 and the second grip member 106. For example, the user may place a thumb 601 of a hand 602 into contact with a second grip member actuation surface 606 and a tip of an index finger 603 of the hand 602 into contact with a first grip member actuation surface 605. The first grip member actuation surface 605 may be an outside facing surface on the first grip member 105. Similarly the second grip member actuation surface 606 may be an outside facing surface on the second grip member 106. The first grip member 105 may be rigidly connected to the interconnection member 102. The second grip member 106 may be rigidly connected to the base 101. Once the fingers are in position as shown in FIG. 6, the user may pinch the index finger 603 and a thumb 601 together. This may result in the interconnection member 102 rotating about the rotational axis 201. This in turn may result in the snap 103 rotating away from the mating engagement feature 151. Thusly, the user may lower the snap apparatus 100 into the position illustrated in FIG. 6 without the snap 103 contacting the mating engagement feature 151. If at this point the user were to release the pinching pressure, the interconnection member 102 would rotate into the position as illustrated in FIG. 3 and the snap apparatus 100 and the mating member 150 would be engaged with each other. It is noted that the positions of the thumb 601 and index finger 603 may be reversed or other combinations of fingers may be used to achieve the pinching motion as illustrated in FIG. 6.

Additionally, the location of the first grip member 105 with respect to the rotational axis 201 may provide mechanical advantage when pinching the snap apparatus 100. In this regard, by placing the first grip member 105 on an end of the interconnection member 102 opposite of the snap 103 with the rotational axis 201 between the first grip member 105 and the snap 103, the interconnection member 102 acts as a lever that provides a mechanical advantage when moving the snap 103.

An embodiment of a process of disengaging the snap apparatus 100 from the mating member 150 when they are engaged as illustrated in FIG. 3 will now be described. Returning to FIG. 6, to disengage the snap apparatus 100, a user may pinch together the first grip member 105 and the second grip member 106 to move the snap 103 away from the mating engagement feature 151. Once the snap 103 is clear of the mating engagement feature 151, the user may pull upward on the snap apparatus 100 to fully disengage the snap apparatus 100 from the mating member 150.

The first grip member actuation surface 605 and/or the second grip member actuation surface 606 may be textured or contain other features to enhance the ability of the snap apparatus 100 to be gripped with a pinching motion. As illustrated, the first grip member actuation surface 605 and the second grip member actuation surface 606 may be concave. This concavity may aid in the gripping of the first grip member 105 and the second grip member 106. The curvature of the concavity may be selected to comfortably interface with a finger or a thumb. Accordingly, the radius of curvature may be at least 4 mm. This concavity and/or any texturing on the first grip member actuation surface 605 and/or the second grip member actuation surface 606 may provide the additional benefit of providing a clear indication to a user of how to grip, install, remove and handle the snap apparatus 100. Accordingly, the snap apparatus 100 may be installed to and removed from engagement with the mating member 150 without the use of a tool. The snap apparatus 100 may be installed, removed, and handled with one hand. In this regard, the same gripping motion used to disengage the snap 103 from the mating engagement feature 151 may also be used to lift the snap apparatus 100 away from the mating member 150 without the need to reposition the grip on the snap apparatus 100. This same grip may also be used to handle the snap apparatus 100.

As shown in FIG. 1, the snap apparatus 100 may also include one or more stoppers 107a and 107b. As shown in FIG. 6, when a user pinches together the first grip member 105 and the second grip member 106, the interconnection member 102 may come into contact with a stopper such as stopper 107b. The stoppers 107a and 107b may serve to prevent a user from displacing the first grip member 105 past a pre-determined point. In this regard, the stoppers 107a and 107b may prevent a user from accidentally damaging the snap apparatus 100. The position of the stoppers 107a and 107b and the configuration of the flexible arms 104a and 104b may be such that a maximum displacement of the interconnection member 102 as illustrated in FIG. 6 does not result in any permanent damage or deformation of the flexible arms 104a and 104b. Without the stoppers 107a and 107b, a user may displace the interconnection member 102 beyond the ability of the flexible arms 104a and 104b to withstand the displacement without damage.

The stoppers 107a and 107b may serve the function of providing a tactile signal to a user that the interconnection member 102 has been displaced enough so that the snap 103 is clear of the mating engagement feature 151. For example, a user may pinch the first grip member 105 and the second grip member 106 until the user feels the contact between the interconnection member 102 and the stoppers 107a and 107b. The feeling of the contact may serve to signal the user that the snap apparatus 100 is free to be engaged with or disengaged from the mating member 150 without resistance from an interaction between the snap 103 and the mating engagement feature 151.

As illustrated in FIG. 1, the interconnection member 102 may include at least one guide wall 108 and the mating member 150 may include a guide block 153. The guide walls 108 may be disposed on opposite sides of the interconnection member 102 and may extend parallel to each other and parallel to the direction of motion of the snap apparatus 100 relative to the mating member 150. The distance between the guide walls 108 may be selected so that the guide walls 108 are disposed on two opposing sides of the guide block 153 when the snap apparatus 100 is engaged with the mating member 150. In such a configuration, interaction between the guide walls 108 and the guide block 153 when the snap apparatus 100 is engaged with the mating member 150 may limit rotation of the interconnection member 102 about an axis perpendicular to the rotational axis 201. In this regard, the interaction between the guide walls 108 and the guide block 153 when a user is pinching the first grip member 105 and the second grip member 106 may assist the user in rotating the interconnection member 102 primarily about the rotational axis 201. This in turn may assist the user in displacing the snap 103 so it is completely clear of the mating engagement feature 151 during engagement or disengagement of the snap apparatus 100 with the mating member 150.

Figure 8:
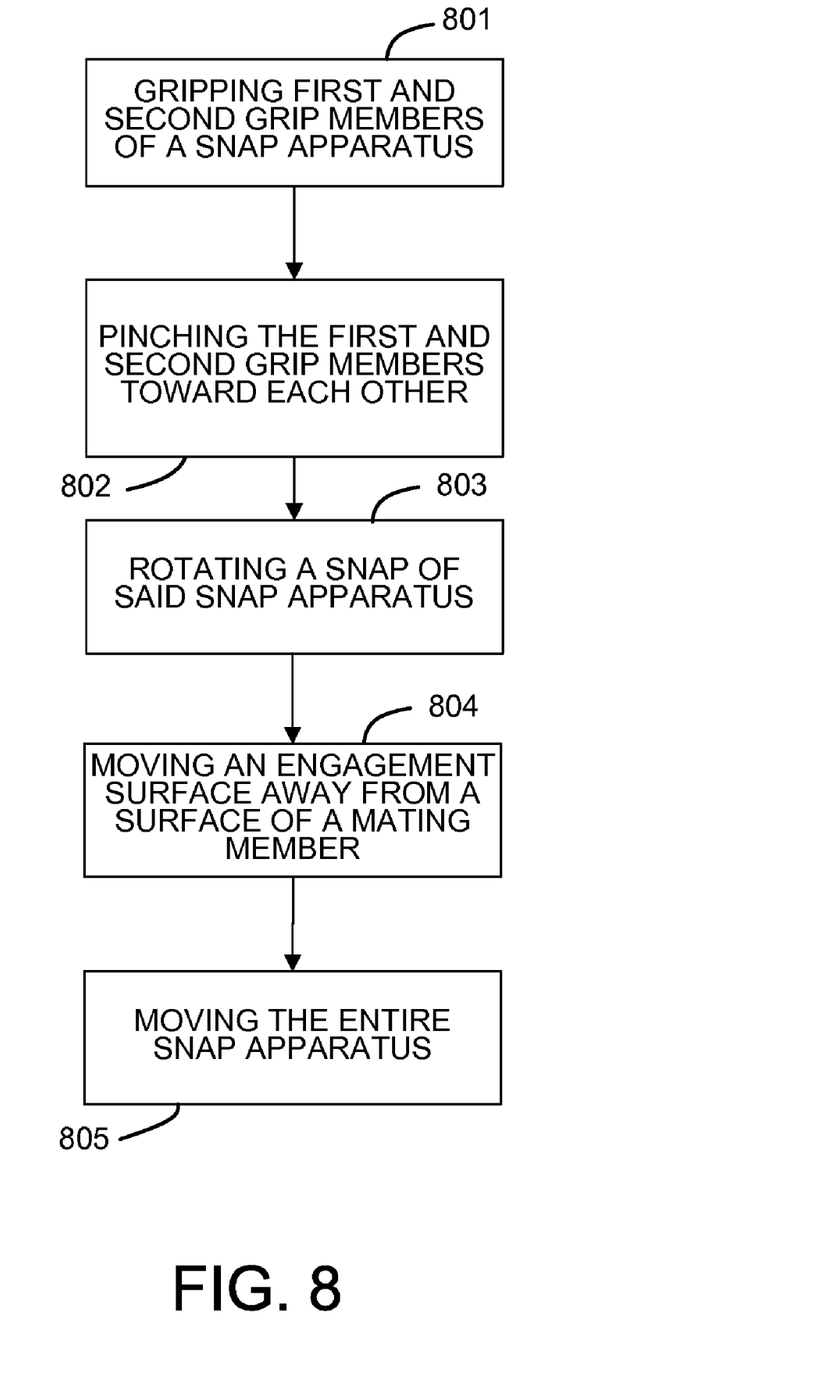
FIG. 8 is a flowchart of an embodiment of a method of removing a snap apparatus from a mating member.

FIG. 8 is a flowchart of a method of removing a snap apparatus from a mating member. The method comprises a first step 801 of gripping a first grip member actuation surface and a second grip member actuation surface with a finger and a thumb of a hand, where the grip member actuation surfaces are parts of a snap apparatus. The two surfaces may face in substantially opposite directions from each other. The two surfaces may be concave. The next step 802 may include using the finger and thumb to pinch together the two surfaces. Pinching the two surfaces together may cause a snap of the snap apparatus to rotate in step 803. In step 804, the rotation of step 803 may result in moving an engagement surface of the snap from a first position to a second position. In the first position, the engagement surface may be in contact with a surface of a mating member, while in the second position, the engagement surface may be free from contact with the surface of the mating member. Step 805 may include moving the entire snap apparatus relative to the mating member while maintaining the pinching force. This may include moving the snap apparatus away from the mating member.

FIG. 7 illustrates an exemplary application of a snap apparatus 100' and a mating member 150' that are similar to the snap apparatus 100 and mating member 150, respectively, of FIG. 1 in an embodiment of a duct and component system 700. In this embodiment, the snap apparatus 100' is incorporated into an electronic component cooling duct 701 and the mating member 150 is incorporated into an electronic component cooling fan apparatus 702. The electronic component cooling fan apparatus 702 may for example, be interconnected to a processor of a computer. The electronic component cooling duct 701 may be used to direct airflow from an active component such as the electronic component cooling fan apparatus 702 or it may be used to direct airflow in a passive cooling configuration such as the airflow around a heat sink. The electronic component cooling duct 701 and the outer casing 705 of the electronic component cooling fan apparatus 702 may be made from a plastic such as is typical of cooling ducts found in personal computers.

The electronic component cooling duct 701 may include a feature, such as guide channel 703, that may restrict the motion of the electronic component cooling duct 701 relative to the outer casing 705 of the electronic component cooling fan apparatus 702. This may be accomplished by interaction between the guide channel 703 and a guide rib 704 of the outer casing 705. As illustrated in FIG. 7, the guide channel 703 may be configured to interact with the guide rib 704 to restrict the motion of the electronic component cooling duct 701 with respect to the electronic component cooling fan apparatus 702. As configured in the embodiment illustrated in FIG. 7, the two components interact to restrict the motion of the electronic component cooling duct 701, once the guide channel 703 is engaged with the guide rib 704, to an up and down motion (as oriented in FIG. 7). The guide channel 703 may include a lead in section 706 that is wider than the majority of the guide channel 703. The lead in section 706 may help a user in initially locating the electronic component cooling duct 701 with respect to the electronic component cooling fan apparatus 702.

The snap apparatus 100' and the mating member 150' may include any or all of the features discussed above with respect to the snap apparatus 100 and mating member 150 of FIGS. 1 through 6. In particular, the electronic component cooling duct 701 may be operable to be engaged with or disengaged from the electronic component cooling fan apparatus 702 without the use of tools. This may be accomplished by handling the electronic component cooling duct 701 by pinching the first grip member 105' and the second grip member 106'. This pinching may result in a snap (not visible in FIG. 7) rotating to a position where it may not interfere with a mating engagement feature 151' of the electronic component cooling fan apparatus 702 when the electronic component cooling duct 701 is installed or removed. The snap apparatus 100' and the mating member 150' may also include features similar to the bracing surfaces, guide walls, and stoppers described above with respect to the snap apparatus 100 and mating member 150 of FIGS. 1 through 6.

In one implementation of a duct and component system 700, the present inventor has determined using finite element analysis that the pinching force required to fully disengage the snap of the snap apparatus 100' from the mating engagement feature 151' may be less than 4.5 kilogram-force (kgf) and that once disengaged, the force required to lift the electronic component cooling duct 701 away from the electronic component cooling fan apparatus 702 may be less than 1 kgf. Furthermore, the force required to fully engage the electronic component cooling duct 701 with the electronic component cooling fan apparatus 702, without pinching the first grip member 105' and the second grip member 106' (e.g., allowing the snap to interact with the mating engagement feature 151' similar to as shown in FIGS. 4 and 5) may be less than 3.5 kgf.

The duct and component system 700 may be operable to prevent unintended separation of the electronic component cooling duct 701 from the electronic component cooling fan apparatus 702. For example, the first grip member 105' and in the second grip member 106' present to a user an intuitive interface for removal of the electronic component cooling duct 701. Given the intuitive nature of the interface, it may be unlikely that a user would accidentally disengage the snap of the snap apparatus 100'. Furthermore, without actively disengaging the snap of the snap apparatus 100' from the mating engagement feature 151', a significant amount of the force may be required to disengage the snap apparatus 100' from the mating member 150'. For example, in one implementation of a duct and component system 700, the present inventor has determined using finite element analysis that a duct and component system 700 as described herein may be operable to resist an upward force of 15 kgf applied to the electronic component cooling duct 701 while it is fully engaged with the electronic component cooling fan apparatus 702 without any damage to the system 700 or separation of the individual components.

Additionally, a user or repair technician that wishes to gain access to the electronic component cooling fan apparatus 702 may be able to quickly discern how to remove the electronic component cooling duct 701 due to the intuitive nature of the interface. This process may also be accomplished without the use of tools. Moreover, the electronic component cooling duct 701 may be operable to be removed from and installed onto the electronic component cooling fan apparatus 702 an unlimited number of times. Also, the electronic component cooling fan apparatus 702 may be accessed by removal of the electronic component cooling duct 701, whereas in known cooling systems a cooling duct and the device to which it is attached may need to be removed as an assembly before the cooling duct can be removed from the device to which it is attached.

As discussed above, the snap apparatus 100' may be engaged with the mating member 150' in a manner that includes a pre-determinable amount of a pre-load on the snap of the snap apparatus 100'. This preload may aid in the ability of the duct and component system 700 to not rattle when the system 700 experiences vibrations. These vibrations, for example, may be due to shipping or moving the device of which the system 700 is a component, vibrations from other proximal components, or vibrations from a cooling fan within the electronic component cooling fan apparatus 702.

Figure 9:
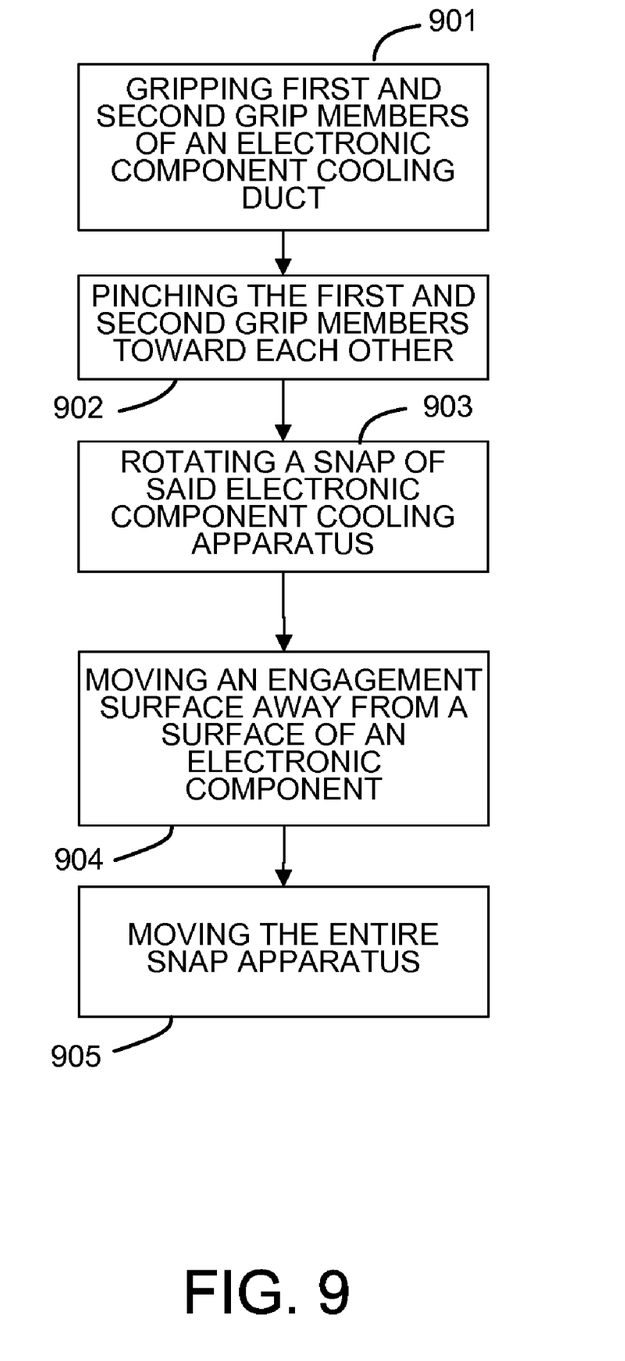
FIG. 9 is a flowchart of an embodiment of a method of removing an electronic component cooling duct from a mating component.

FIG. 9 is a flowchart of a method of removing an electronic component cooling duct from a mating component. The method comprises a first step 901 of gripping a first grip member actuation surface and a second grip member actuation surface with a finger and a thumb of a hand, where the grip member actuation surfaces are parts of the electronic component cooling duct. The two surfaces may face in substantially opposite directions from each other. The two surfaces may be concave. The next step 902 may include using the finger and thumb to pinch together the two surfaces. Pinching the two surfaces together may cause a snap of the electronic component cooling duct to rotate in step 903. In step 904, the rotation of step 903 may result in moving an engagement surface of the snap from a first position to a second position. In the first position, the engagement surface may be in contact with a surface of the mating component, while in the second position, the engagement surface may be free from contact with the surface of the mating component. Step 905 may include moving the entire electronic component cooling duct relative to the mating component while maintaining the pinching force. This may include moving the electronic component cooling duct away from the mating component.

It should be understood that the particular values and configurations described herein could be varied and achieve the same objectives. The values and configurations described herein are merely exemplary.

The foregoing description has been presented for purposes of illustration and description. Furthermore, the description is not intended to limit the invention to the embodiments and form disclosed herein. While a number of exemplary aspects and embodiments have been discussed above, those of skill in the art will recognize certain variations, modifications, permutations, additions, and sub-combinations thereof. It is therefore intended that the following appended claims and claims hereafter introduced are interpreted to include all such variations, modifications, permutations, additions, and sub-combinations as are within their true spirit and scope.

What is claimed is:

1. A snap apparatus for attachment to and removal from a mating member without the use of tools, comprising:
    a snap;
    a first grip member, wherein said first grip member includes a first grip member actuation surface;
    an interconnection member, wherein said interconnection member is rigidly interconnected to said snap and said first grip member;
    a base;
    a flexible member, wherein said flexible member is interconnected to and disposed between said base and said interconnection member;
    a second grip member rigidly interconnected to said base, wherein said second grip member includes a second grip member actuation surface, wherein said first grip member actuation surface is oriented to face in a substantially opposite direction from said second grip member actuation surface, wherein said snap includes an engagement surface extending perpendicular to said interconnection member, wherein said flexible member comprises two flexible arms disposed on opposite sides of said interconnection member.

2. The apparatus of claim 1, wherein said interconnection member further comprises:
    two guide walls disposed parallel to each other, perpendicular to said engagement surface and substantially perpendicular to said first grip member actuation surface.

* * * * *